3,839,507
THIOPHOSPHITE ESTERS
Ingenuin Hechenbleikner, West Cornwall, Conn., and Kenneth H. Rattenbury, Morgantown, W. Va., assignors to Borg-Warner Corporation, Chicago, Ill.
No Drawing. Filed Mar. 15, 1973, Ser. No. 341,595
Int. Cl. B01j 1/18; C07f 9/16
U.S. Cl. 260—928   13 Claims

ABSTRACT OF THE DISCLOSURE

Phosphites are prepared of the formulas $$((RS)_2\!-\!P\!-\!S\!-\!(CH_2)_nCOO\!-\!CH_2)_o(CR_1R_2)_m$$

and $$((RS)_2\!-\!P\!-\!S\!-\!(CH_2)_nCOOCHCH_2OOC(CH_2)_nSP\!-\!(SR)_2$$
$$|$$
$$CH_3$$

wherein R is alkyl, aryl, aralkyl, —CH$_2$COOR$_3$ or —CH$_2$CH$_2$COOR$_3$ where R$_3$ is alkyl, aryl or aralkyl, R$_1$ and R$_2$ are zero, hydrogen or lower alkyl, n is 1 or 2, o is 2 to 4, m is 0 to 8. They are used as antioxidants and stabilizers against heat and light.

The present invention relates to novel thiophosphites of the formula (1)  $((RS)_2\!-\!P\!-\!S\!-\!(CH_2)_nCOOCH_2)_o(CR_1R_2)_m$ or (1a)
$$CH_3$$
$$|$$
$$((RS)_2\!-\!P\!-\!S\!-\!(CH_2)_nCOOCHCH_2OOC(CH_2)_nSP\!-\!(SR)_2$$

where R is alkyl, aryl, aralkyl, —CH$_2$COOR$_3$ or —CH$_2$CH$_2$COOR$_3$ where R$_3$ is alkyl, aryl or aralkyl, R$_1$ and R$_2$ are zero, hydrogen or lower alkyl, n is 1 or 2, o is 2 to 4 and m is 0 to 8. Preferably R is —CH$_2$COOR$_3$ or —CH$_2$CH$_2$COOR$_3$.

The compounds are prepared by reacting 2 moles of a compound having the formula RSH with one mole of PX$_3$ where X is chlorine or bromine, i.e., PCl$_3$ or PBr$_3$ and sufficient of a compound having the formula (2)   $(HS(CH_2)_nCOOCH_2)_o\!-\!(CR_1R_2)_m$ to react with the remaining halogen on the PX$_3$.

The starting compound of formula (2) can be prepared by reacting a compound of the formula HS(CH$_2$)$_n$COOH with an appropriate polyhydric alcohol, e.g., by reacting mercaptoacetic acid (thioglycolic acid) or mercaptopropionic acid with ethylene glycol, propylene glycol, butylene glycol, trimethylene glycol, tetramethylene glycol, hexamethylene glycol, octamethylene glycol, decamethylene glycol, glycerine, trimethylolethane, trimethylol propane, trimethylolbutane or pentaerythritol.

Examples of compounds of formula (2) are ethylene glycol bis(thioglycolate), ethylene glycol bis(mercaptopropionate), propylene glycol bis(thioglycolate), propylene glycol bis(mercaptopropionate), trimethylene glycol bis(mercaptopropionate), tetramethylene glycol bis(thioglycolate), hexamethylene glycol bis(thioglycolate), octamethylene glycol bis(mercaptopropionate), decamethylene glycol bis(mercaptopropionate), decamethylene glycol bis(thioglycolate), glycerine tris(thioglycolate), glycerine tris(mercaptopropionate), trimethylolethane tris(thioglycolate), trimethylolethane tris(mercaptopropionate), trimethylolpropane tris(thioglycolate), trimethylol tris(mercaptopropionate), trimethylolbutane tris(thioglycolate), trimethylolbutane tris(mercaptopropionate), pentaerythritol tetrathioglycolate, pentaerythritol tetramercaptopropionate.

Examples of compounds having the formula RSH are methyl mercaptan, ethyl mercaptan, propyl mercaptan, isopropyl mercaptan, butyl mercaptan, hexyl mercaptan, cyclohexyl mercaptan, octyl mercaptan, decyl mercaptan, isooctyl mercaptan, sec.-butyl mercaptan, decyl mercaptan, lauryl mercaptan, hexadecyl mercaptan, octadecyl mercaptan, eicosanyl mercaptan, thiophenol, thiocresol, thioxylenol, 4-butyl thiophenol, thionaphthol, benzyl mercaptan, methyl thioglycolate, methyl mercaptopropionate, ethyl thioglycolate, propyl mercaptopropionate, butyl thioglycolate, butyl mercaptopropionate, sec.-butyl thioglycolate, hexyl mercaptopropionate, cyclohexyl mercaptopropionate, cyclohexyl thioglycolate, isooctyl thioglycolate, isooctyl mercaptopropionate, n-octyl thioglycolate, n-decyl mercaptopropionate, isodecyl thioglycolate, lauryl thioglycolate, lauryl mercapto propionate, cetyl mercaptopropionate, octadecyl thioglycolate, octadecyl mercaptopropionate, eicosanyl thioglycolate, benzyl mercaptopropionate, benzyl thioglycolate, phenyl thioglycolate, phenyl mercaptopropionate, p-tolyl thioglycolate, m-tolyl mercaptopropionate, alphanaphthyl mercaptopropionate, betanaphthyl thioglycolate. If a mixture of RSH compounds is employed, products having a mixture of terminal R groups will be obtained.

Examples of phosphites within the invention made from the above mentioned reactants include compounds such as $(CH_3OOCCH_2S)_2PSCH_2COOH_2CH_2$
$OOCCH_2SP(SCH_2COOH_3)_2$ and the corresponding compounds where R$_3$ in formula (1) is ethyl, propyl, butyl, sec.-butyl, hexyl, cyclohexyl, octyl, isooctyl, decyl, isodecyl, lauryl, cetyl, octadecyl, eicosanyl, phenyl, tolyl, naphthyl or benzyl, $((n\text{-}C_{16}H_{33}OOCCH_2S)_2PSCH_2CH_2COOCH_2)_2$ and the corresponding compounds where R$_3$ in formula (1) is methyl, ethyl, propyl, isopropyl, butyl, sec.-butyl, hexyl, cyclohexyl, octyl, isooctyl, 2-ethylhexyl, decyl, isodecyl, lauryl, octadecyl, eicosanyl, phenyl, tolyl, naphthyl or benzyl, $((n\text{-}C_{10}H_{19}OOCCH_2CH_2S)_2PSCH_2COOCH_2)_2$ and the corresponding compounds where R$_3$ in formula (1) is methyl, ethyl, propyl, isopropyl, butyl, sec.-butyl, hexyl, cyclohexyl, octyl, isooctyl, 2-ethylhexyl, isodecyl, lauryl, cetyl, octadecyl, eicosanyl, phenyl, tolyl, naphthyl or benzyl, $((n\text{-}C_8H_{17}S)_2PSCH_2COOCH_2)_2$ and the corresponding compounds where R in formula (1) is methyl, ethyl, propyl, isopropyl, butyl, sec.-butyl, hexyl, cyclohexyl, isooctyl, 2-ethylhexyl, decyl, isodecyl, lauryl, cetyl, octadecyl, eicosanyl, phenyl, tolyl, naphthyl or benzyl, $((n\text{-}C_{18}H_{37}S)_2PSCH_2CH_2COOCH_2)_2$ and the corresponding compounds where R in formula (1) is methyl, ethyl, propyl, isopropyl, butyl, isobutyl, sec.-butyl, hexyl, cyclohexol, octyl, isooctyl, 2-ethylhexyl, decyl, isodecyl, lauryl, cetyl, eicosanyl, phenyl, tolyl, naphthyl or benzyl, $$CH_3$$
$$|$$
$$(i\text{-}C_8H_{17}OOCH_2S)_2P\!-\!SCH_2COOCHCH_2\!-$$
$$OOCH_2SP(SCH_2COOC_8H_{17}\text{-}i)_2$$

and the corresponding compounds where R$_3$ in formula (1a) is methyl, ethyl, propyl, butyl, sec.-butyl, hexyl, cyclohexyl, n-octyl, decyl, isodecyl, lauryl, cetyl, octadecyl, eicosanyl, phenyl, tolyl, naphthyl or benzyl, $$((C_6H_{11}OOCCH_2CH_2S)_2P-SCH_2CH_2COOCH_2)_2(CH_2)_4$$

and the corresponding compounds where $R_3$ in formula (1) is methyl, ethyl, propyl, isopropyl, butyl, sec.-butyl, hexyl, octyl, isooctyl, 2-ethylhexyl, decyl, isodecyl, lauryl, cetyl, octadecyl, eicosanyl, phenyl, tolyl, naphthyl or benzyl, $$((C_5H_{11}OOCCH_2S)_2P-SCH_2COOCH_2)_2(CH_2)_8$$

and the corresponding compounds where $R_3$ in formula (1) is methyl, ethyl, propyl, isopropyl, butyl, sec.-butyl, hexyl, cyclohexyl, octyl, isooctyl, decyl, isodecyl, lauryl, cetyl, octadecyl, eicosanyl, phenyl, tolyl, naphthyl or benzyl, $$((C_3H_7OOCCH_2S)_2P-SCH_2COOCH_2)_4C$$

and the corresponding compounds where $R_3$ in formula (1) is methyl, ethyl, isopropyl, butyl, decyl, cetyl, lauryl, sec.-butyl, amyl, hexyl, cyclohexyl, octyl, octadecyl, 2-ethylhexyl, eicosanyl, phenyl, tolyl, naphthyl or benzyl, $$((sec.C_4H_9OOCCH_2S)_2P-SCH_2COOCH_2)_4C$$

and the corresponding compounds where $R_3$ in formula (1) is methyl, ethyl, isopropyl, butyl, lauryl, amyl, hexyl, cyclohexyl, octyl, isooctyl, 2-ethylhexyl, decyl, cetyl, isodecyl, octadecyl, eicosanyl, phenyl, tolyl, naphthyl, xylyl or benzyl, $$((C_{12}H_{25}S)_2P-SCH_2COOCH_2)_4C$$

and the corresponding compounds where R in formula (1) is methyl, ethyl, propyl, isopropyl, butyl, sec.-butyl, amyl, hexyl, cyclohexyl, octyl, isooctyl, 2-ethylhexyl, decyl, isodecyl, cetyl, octadecyl, eicosanyl, phneyl, tolyl, naphthyl or benzyl, $$((C_6H_5OOCCH_2S)_2P-SCH_2COOCH_2)_3C-CH_3$$

and the corresponding compounds where R in formula (1) is methyl, ethyl, propyl, isopropyl, butyl, sec.-butyl, amyl, hexyl, cyclohexyl, octyl, isooctyl, 2-ethylhexyl, decyl, isodecyl, lauryl, cetyl, octadecyl, ecosanyl, tolyl, naphthyl or benzyl, $$((C_6H_{13}OOCCH_2CH_2S)_2P-SCH_2CH_2COOCH_2)_3-C-CH_3$$

and the corresponding compounds where $R_3$ in formula (1) is methyl, ethyl, propyl, isopropyl, butyl, sec.-butyl, amyl, cyclohexyl, octyl, isooctyl, 2-ethylhexyl, decyl, isodecyl, lauryl, cetyl, octadecyl, eicosanyl, tolyl, phenyl, naphthyl or benzyl, $$((C_8H_{17}OOCCH_2S)_2P-SCH_2COOCH_2)_3-C-C_2H_5$$

and the corresponding compounds where $R_3$ in formula (1) is methyl, ethyl, propyl, isopropyl, butyl, sec.-butyl, amyl, cyclohexyl, hexyl, isooctyl, 2-ethylhexyl, decyl, isodecyl, lauryl, cetyl, octadecyl, phenyl, tolyl, naphthyl or benzyl, $$((C_2H_5OOCCH_2CH_2S)_2P-SCH_2CH_2COOCH_2)_3-C-C_2H_5$$

and the corresponding compounds where $R_3$ in formula (1) is methyl, propyl, isopropyl, butyl, sec.-butyl, amyl, cyclohexyl, hexyl, octyl, isooctyl, 2-ethylhexyl, decyl, isodecyl, lauryl, cetyl, octadecyl, eicosanyl, phenyl, tolyl, naphthyl or benzyl, $$((i-C_8H_{17}S-P)_2-SCH_2COOCH_2)_3-C-C_2H_5$$

and the corresponding compounds where R in formula (1) is methyl, ethyl, propyl, isopropyl, butyl, sec.-butyl, amyl, hexyl, cyclohexyl, octyl, isooctyl, 2-ethylhexyl, decyl, isodecyl, lauryl, cetyl, octadecyl, eicosanyl, phenyl, tolyl, naphthyl or benzyl.

In the above illustrative examples, all of the R groups or all of the $R_3$ groups are the same. However, as pointed out, supra, compounds having a mixture of R groups or a mixture of $R_3$ groups can also be prepared and used according to the invention simply by starting with a plurality of RSH compounds.

The thiophosphites are useful as antioxidants, e.g., at room temperature or elevated temperature, and as heat stabilizers in various applications, e.g., for polyethylene, polypropylene, EPDM rubber, vinyl chloride resins, foods, lubricating oil, natural rubber, rubbery butadiene-styrene copolymer, rubbery butadiene-acrylonitrile copolymer, butadiene-styrene terpolymer (ABS), poly-cis-isoprene, polyesters, etc.

Unless otherwise indicated, all parts and percentages are by weight.

As stated, the compounds of the present invention are useful as antioxidants and stabilizers for halogen containing resins, preferably vinyl chloride resins.

As the halogen containing resins there can be used resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixtures with each other or with vinylidene compounds free from halogen. Among the halogen free materials which can be copolymerized with the halogen containing vinylidene compounds, e.g., vinyl chloride, are vinyl esters of carboxylic acids, e.g., vinyl acetate, vinyl propionate, vinyl butyrate and vinyl benzoate, esters of unsaturated acids, e.g., alkyl and alkenyl acrylates such as methyl acrylate, ethyl acrylate, propyl acrylate, butyl acrylate and allyl acrylate as well as the corresponding methacrylates, e.g., methyl methacrylate and butyl methacrylate, vinyl aromatic compounds, e.g., styrene, p-ethyl styrene, divinyl benzene, vinyl naphthalene, α-methyl styrene, p-methyl styrene, dienes such as butadiene and isoprene, unsaturated amides such as acrylamide, methacrylamide and acrylanilide and the esters of α,β-unsaturated carboxylic acids, e.g., the methyl, ethyl, propyl, butyl, amyl, hexyl, heptyl, octyl, allyl, methallyl and phenyl esters of maleic, crotonic, itaconic and fumaric acids and the like. Specific examples of such esters are diethyl maleate, dibutyl maleate and dibutyl fumarate.

The copolymers in which at least 50 percent of the copolymer is made from a halogen containing vinylidene compound such as vinyl chloride are preferably treated according to the invention.

The stabilizers of the present invention are also effective when intimately mixed with halogen containing resins in which part or all of the halogen is introduced into a preformed resin, e.g., chlorinated polyvinyl acetate, chlorinated polystyrene, chlorinated polyethylene, chlorinated polyvinyl chloride, chlorinated natural and synthetic rubbers and rubber hydrochloride.

Typical examples of copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The resin, e.g., polyvinyl chloride, can either be plasticized or unplasticized. As the plasticizer there can be employed conventional materials such as dioctyl phthalate, octyl decyl phthalate, tricresyl phosphate, 2-ethylhexyl diphenyl phosphate, dodecyl dicresyl phosphate, tributyl acetyl citrate, dioctyl sebacate, dibutyl sebacate, etc. The plasticizer is used in conventional amount, e.g., 10 to 100 parts for each 100 parts of the vinyl chloride-containing resin.

The thiophosphite containing stabilizers of the present invention are used in an amount of 0.05 to 20 parts, preferably 0.1 to 10 parts per 100 parts of halogen containing resin.

There can be incorporated 0.1 to 10 parts per 100 parts of the halogen containing resin of a metal salt stabilizer. Thus, there can be used barium, strontium, calcium, cadmium, zinc, lead, tin, magnesium, cobalt, nickel, titanium and aluminum salts of phenols, aromatic carboxylic acids, fatty acids and epoxy fatty acids.

Examples of suitable salts include barium di(nonylphenolate), strontium di(nonylphenolate), strontium di (amylphenolate), barium di(octylphenolate), barium di (nonyl-o-cresolate), lead di(octylphenolate), cadmium-2-ethylhexoate, cadmium laurate, cadmium stearate, zinc caprylate, cadmium caproate, barium stearate, barium 2-ethylhexoate, barium laurate, barium ricinoleate, lead stearate, aluminum stearate, magnesium stearate, calcium octoate, calcium stearate, cadmium naphthenate, cadmium benzoate, cadmium p-tert.-butylbenzoate, barium octyl salicylate, cadmium epoxy stearate, strontium epoxy stearate, cadmium salt of epoxidized acids of soybean oil, and lead epoxy stearate.

In plastisol formulations there is preferably also included from 0.1 to 10 parts per 100 parts of resin of an epoxy vegetable oil such as epoxidized soybean oil or epoxidized tall oil.

Also can be incorporated a phosphite, e.g., an alkyl, aryl or aralkyl phosphite in an amount of 0.1 to 10 parts per 100 parts of resin. Typical of such phosphites are triphenyl phosphite, tridecyl phosphite, decyl diphenyl phosphite, di(p-tert.-butylphenyl) phenyl phosphite, diphenyl-o-cresyl phosphite, trioctyl phosphite, tricresyl phosphite and tribenzyl phosphite.

The compounds of the present invention are also stabilizers and oxidants for monoolefin polymers such as polyethylene, polypropylene, ethylene propylene copolymers (e.g., 50:50, 80:20 and 20:80), ethylene-monoolefin copolymers wherein the monoolefin has four to 10 carbon atoms and is present in a minor amount, e.g., ethylene-butene-1 copolymer (95:5) and ethylene-decene-1 copolymer (90:10). Furthermore, they can be used to stabilize natural rubber, styrene-butadiene rubber (SBR rubber), e.g., 75% butadiene, 25% styrene, and EPDM rubbers and acrylonitrile-butadiene-styrene terpolymers (ABS).

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent) of propylene and 1 to 15 molar percent (preferably 3 to 5 molar percent) of the non-conjugated polyolefin. Usually the polyolefin is not over 10 molar percent. The ethylene and propylene can each be 5 to 95 molar percent of the composition.

As used in the present specification and claims, the term nonconjugated polyolefin includes aliphatic nonconjugated polyene hydrocarbons and cycloaliphatic nonconjugated polyene hydrocarbons, e.g., endocyclic dienes. Specific examples of suitable nonconjugated polyolefins include pentadiene-1,4, hexadiene-1,4, dicyclopentadiene, methyl cyclopentadiene dimer, cyclododecatriene, cyclooctadiene-1,5, 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pat. Nos. 2,933,480, 3,000,866, 3,063,973, 3,093,620, 3,093,621, and 3,136,739, in British Pat. No. 880,904, and in Belgian Pat. No. 623,698.

Terpolymers and other EPDM rubbers from ethylene, propylene and dicyclopentadiene are exemplified in Tarney U.S. Pat. No. 3,000,866, Adamek U.S. Pat. No. 3,136,739 and Dunlop (British) Pat. No. 880,904. EPDM rubbers from ethylene, propylene and 1,4-hexadiene are exemplified in Gresham U.S. Pat. No. 2,933,480. As shown in Gresham other suitable non-conjugated diolefins are 1,4-pentadiene, 2-methyl-1,5 hexadiene, 3,3-dimethyl-1,5-hexadiene, 1,7-octadiene, 1,9-decadiene, 1,9-eicosadiene, 1,4-hexadiene, 1,9-octadecadiene, 6-methyl-1,5-heptadiene, 7-methyl-1,6-octadiene, 11-ethyl-1,11-tridecadiene.

EPDM rubbers from ethylene, propylene and 5-methylene-2-norbornene are exemplified in U.S. Pat. No. 3,093,621. Suitable norbornadienes, e.g., 2-methyl norbornadiene, 2-ethyl norbornadiene, 2-n-heptyl norbornadiene, are shown in Gladding U.S. Pat. No. 3,063,973 and bicyclo compounds such as bicyclo(2,2,2) heptadiene-2,5 are shown in Dunlop (British) Pat. No. 880,904. The use of cyclooctadiene-1,5 and other cyclodienes is shown in Montecatini (Belgium) Pat. No. 623,698. Thus these can be used in making the EPDM elastomer 1,4-cycloheptadiene, 1,4-cyclooctadiene, 1,6-cyclodecadiene, 1,5-cyclododecadiene, 1,7-cyclodecadiene, 1,5,9-cyclododecatriene, 1-methyl-1,5-cyclooctadiene.

The compounds of the present invention are normally employed in an amount of at least 0.01 percent and usually 0.1 percent to 10 percent by weight of the polymer they are intended to stabilize.

They can also be used as synergistic stabilizers with other sulfur containing compounds. Thus, there can be employed therewith neutral sulfur compounds having a thio linkage beta to a carbon atom having both a hydrogen atom and a carboxyl group attached thereto. Such compounds are used in an amount of 0.01 to 10 percent, preferably 0.1–5 percent. Thus, there can be used pentaerythritol tetra(mercaptoacetate), 1,1,1-trimethylolethane-tris(mercaptoacetate), 1,1,1 - trimethylolpropane - tri - (mercaptoacetate), 1,1,1 - trimethylolpropane - tris(mercaptoacetate), dioleyl thiodipropionate, dilauryl thiodipropionate, other thio compounds including distearyl-3,3'-thiodipropionate, dicyclohexyl - 3,3' - thiodipropionate, dicetyl - 3,3' - thiodipropionate, dioctyl - 3,3' - thiodipropionate, dibenzyl - 3,3' - thiodipropionate, lauryl myristyl-3,3' - thiodipropionate, diphenyl - 3,3' - thiodipropionate, di-p-methoxy-phenyl - 3,3'-thiodipropionate, didecyl-3,3'-thiodipropionate, dibenzyl - 3,3'-thiodipropionate, diethyl-3,3'-thiodipropionate, lauryl ester of 3 - methylmercapto propionic acid, lauryl ester of 3-butylmercapto propionic acid, lauryl ester of 3-lauryl - mercapto propionic acid, phenyl ester of 3 - octylmercapto propionic acid, lauryl ester of 3-phenyl- mercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-hydroxymethylmercaptopropionic acid, myristyl ester of 3-hydroxyethylmercapto propionic acid, octyl ester of 3-methoxymethylmercapto propionic acid, dilauryl ester of 3-carboxymethylmercapto propionic acid, dilauryl ester of 3-carboxypropylmercapto propionic acid, dilauryl-4,7-dithiosebacate, dilauryl-4,7,8,11 - tetrathiotetradecandioate, dimyristyl - 4,11 - dithiotetradecandioate, lauryl - 3 - benzothiazylmercaptoproprionate. Preferably the esterifying alcohol is an alkanol having 10 to 18 carbon atoms. Other esters of beta thiocarboxylic acids set forth in Gribbins U.S. Pat. No. 2,519,744 can also be used.

Other beta thiocarboxylic acids include stearyl (1,2-dicarboethoxyethylthio) acetate, stearyl (1,2-dicarbolauryloxyethylthio)acetate or the like. Compounds of this type can be made by addition of alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilauryl maleate, phenylthiodioctyl maleate, cetyl (1,2-dicarboethoxyethylthio) propionate and benzylthiodimyristyl maleate.

Similar useful beta thiocarboxyl syngergistic compounds can be prepared by addition of mercaptans across the double bond of dialkyl itaconates, citraconates, fumarates or trialkyl aconitates, e.g., the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the additional product of the lauryl ester of mercaptopropionic acid with triethyl aconitate.

The thermal stability of the polypropylene and other monoolefin polymers is adversely affected by impurities including residual catalyst. When thermal stability is important in addition to oxidative stability it has been found valuable to include polyvalent metal salts of fatty acids in an amount of 0.01–10 percent, preferably 0.1–5 percent, in the monoolefin polymer formulations. Examples of such salts are calcium stearate, calcium 2-ethylhexoate, calcium octoate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously.

There can also be added phenolic antioxidants in an amount of 0.01–10 percent, preferably 0.1–5 percent. Examples of such phenols include 2,6-di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylenebis(4 - methyl-6-t-butylphenol), 2,6 - butyl - 4-decyloxyphenol, 2-t-butyl-4-dodecyloxyphenol, 2-t-butyl-4-dodecyloxy-phenol, 2-butyl-4-octadecyloxyphenol, 4,4'-methylenebis(2,6-di-t-butyl phenol), p-aminophenol, N-lauryloxy-p-aminophenol, 4,4'-thiobis(3-methyl-6-t-butylphenol), bis (o-(1,1,3,3-tetramethylbutyl)phenol) sulfide, 4-acetyl-β-resorcylic acid, A-stage p-t-butylphenol-formaldehyde resin, 4-dodecyloxy-2-hydroxybenzophenone, 3-hydroxy-4-(phenylcarbonyl)phenyl palmitate, n-dodecyl ester of 3-hydroxy-4-(phenylcarbonyl) phenoxyacetic acid, and t-butylphenol.

The use of epoxy compounds in an amount of 0.01–5 percent in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cotton seed oil, epichlorohydrinbisphenol A resins (epichlorohydrindiphenylolpropane resins), phenoxy propylene oxide, butoxy propylene oxide, epoxidized neopentylene oleate, glycidyl epoxystearate, epoxidized α-olefins, epoxidized glycidyl soyate, dicyclopentadiene dioxide, epoxidized butyl tallate, styrene oxide, dipentene dioxide, glycidyl vinyl cyclohexene dioxide, glycidyl ether of resorcinol, glycidyl ether of hydroquinone, glycidyl ether of 1,5-dihydroxynaphthalene, epoxidized linseed oil fatty acids, allyl glycidyl ether, butyl glycidyl ether, cyclohexane oxide, 4-(2,3-epoxypropoxy)acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol-bis-9,10 - epoxystearate. They can also be employed together with conventional phosphites or thiophosphites, e.g., tristearyl phosphite, or any of the thiophosphites mentioned in Friedman U.S. Pat. No. 3,039,993 or Larrison U.S. Pat. No. 3,341,629 or Friedman U.S. Pat. No. 3,053,818. The conventional phosphites can be used in an amount of 0.1 to 10 percent of the weight of the polymer being stabilized.

In place of the triethylamine employed in Examples 1–4 there can be used any other conventional HCl binder, e.g., other tertiary amines such as trimethylamine, tri- butylamine, diethylpropylamines, N,N-dimethylaniline, or pyridine. There can also be used ammonia, etc.

As illustrated in Example 3, the amount of polyhydric alcohol ester of the mercaptoalkanoic acid can be used in excess if desired.

EXAMPLE 1

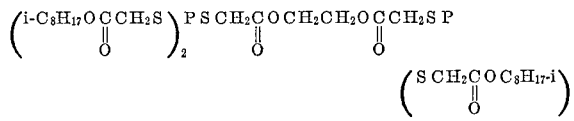

2.0 moles of isooctyl thioglycolate (408 grams). 0.5 mole of ethylene glycol-bis-thioglycolate (105 grams), 3.0 moles of triethylamine (303 grams), and 300 ml. of methylene chloride were charged to a 2 liter flask fitted with stirrer, condenser, addition funnel, and thermometer. 1.0 mole of phosphorus trichloride (87 ml.) was added over a half-hour period at 35–40° C. The mixture was then held at 35–40° C. for one hour.

Triethylamine hydrochloride was filtered out of the product, the filter cake was reslurried in 500 ml. of methylene chloride and refiltered.

The filtrates were combined and the product was stripped to 150° C. at 1 mm. Hg.

The yield was 532.9 grams, 98.5%, and the product was a white, moderately viscous oil.

EXAMPLE 2

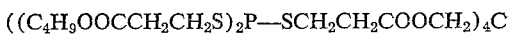

2.0 moles of butylmercaptopropionate (324 grams), 0.25 mole of pentaerythritoltetramercaptopropionate (122 grams), 3 moles of triethylamine and 300 ml. of methylene chloride were charged to a 2 liter flask and reacted as in Example 1, with 1.0 mole of PCl$_3$. 300 ml. of methylene chloride were added prior to the filtration to decrease the viscosity. The filtration was performed as in Example 1, and the cake was extracted as in Example 1.

The product solutions were stripped to 120° C. at 1 mm. Hg.

The yield was 473.1 grams, 96%, and the product was a pale yellow, viscous oil.

EXAMPLE 3

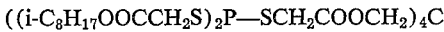

0.25 mole of pentaerythritoltetrathioglycolate (108.5 grams), 2 moles of isooctylthioglycolate (408 grams), 3.0 moles of triethylamine (216 grams), and 600 ml. of methylene chloride were reacted with 1.0 mole of phosphorus trichloride as in Examples 1 and 2. The filter cake was extracted as in the previous examples.

The product was stripped to 120° C. at 1 mm. Hg. The yield was 386.0 grams. 95%. The product was a pale yellow, very viscous oil.

EXAMPLE 4

0.33 mole of trimethylolethane tristhioglycolate (114 grams), 2.0 moles of isooctyl thioglycolate (408 grams), 3.0 moles of triethylamine (303 grams), and 300 ml. of methylene chloride were charged to a 2 liter flask and reacted as in Example 1 with 1.0 mole of phosphorus trichloride (87 ml.).

The filter cake was extracted as in Examples 1, 2, and 3. The product was stripped to 120° C. at 1 mm. Hg.

The yield was 400.1 grams, 97.6%. The product was a water-white viscous oil.

EXAMPLE 5

One part of the product of Example 1 was mixed with 100 parts of polyvinyl chloride to give a polyvinyl chloride product having improved heat stability. Similar results were obtained when the product of Example 1 was replaced by that of Examples 2, 3 and 4.

EXAMPLE 6

One part of the product of Example 2 was mixed with 100 parts of vinyl chloride resin also containing 60 parts of dioctyl phthalate and 1 part of barium-cadmium laurate to impart improved heat stability to the polyvinyl chloride. Similar results were obtained by replacing the product of Example 2 by the products of Examples 1, 3 and 4.

EXAMPLE 7

One part of the product of Example 3 was mixed with 100 parts of polypropylene (Profax 6501) to stabilize the polymer against oxidation. Similar results were obtained by replacing the product of Example 3 by the product of Examples 1, 2 and 4.

EXAMPLE 8

One part of the product of Example 4 was mixed with 100 parts of natural rubber to stabilize the rubber against oxidation. Similar results were obtained by replacing the product of Example 4 by the products of Examples 1, 2 and 3.

EXAMPLE 9

One part of the product of Example 1 was mixed with 100 parts of EPDM rubber (55 mole percent ethylene, 41 mole percent propylene, 4 mole percent dicyclopentadiene) to stabilize the rubber against oxidation. Similar results were obtained by replacing the product of Example 1 by the products of Examples 2, 3 and 4.

EXAMPLE 10

100 parts of polypropylene (melt index 0.4) was mixed with a stabilizer consisting of 0.2 part of the product of Example 2, 0.2 part of dilaurylthiodipropionate and 0.2 part of calcium stearate to give a polypropylene of improved stability against heat and oxidation, e.g., at 133° C. Similar results were obtained by replacing the product of Example 2, by the products of Examples 1, 3 and 4.

EXAMPLE 11

100 parts of polypropylene (melt index 0.4) were mixed with a stabilizer consisting of 0.2 part of the product of Example 4, 0.2 part of dilaurylthiodipropionate, 0.2 part of 2,2'-methylene bis(4-methyl-6-t-butylphenol) to give a polypropylene having improved heat and oxidation resistance. Similar results were obtained by replacing the product of Example 4 by the products of Examples 1, 2 and 3.

The products of the present invention can also be used with ultraviolet light stabilizers to give polypropylene compositions having improved resistance to ultraviolet light. Thus, they can be employed with hydroxybenzophenones such as 2-hydroxy-4-n-octoxybenzophenone and benzotriazoles, e.g., Tinuvin 327 (2(2'-hydroxy-3',5'-di-t-butylphenyl) chlorobenzotriazole) and Tinuvin 328. Thus, they can be used in place of Weston 9–3–P, 9–4–P, 9–5–P, 9–6–P, 9–7–P or 9–8–P in any of the samples in Examples 1 and 2 of McNally German Offenlegungschrift 2,133,493, Apr. 6, 1972.

What is claimed is:

1. A compound having one of the formulae:

(1)  $((RS)_2-P-S-(CH_2)_n COOCH_2)_o (CR_1R_2)_m$ or (2)  $((RS)_2-P-S-(CH_2)_n COO\overset{\underset{\displaystyle CH_3}{|}}{C}HCH_2OOC(CH_2)_n S-P-(SR)_2$ where R is alkyl of 1 to 20 carbon atoms, phenyl, alkyl phenyl having up to 4 carbon atoms in the alkyl group, naphthyl, cyclohexyl or benzyl, or $(-CH_2)_n COOR_3$ where $R_3$ is alkyl of 1 to 20 carbon atoms, cyclohexyl, phenyl, tolyl, naphthyl or benzyl, $n$ is 1 or 2, $o$ is 2 to 4, $m$ is 0 to 8 and $R_1$ and $R_2$ are zero, hydrogen or lower alkyl.

2. A compound according to claim 1, where R is $(CH_2)_n COOR_3$.

3. A compound according to claim 2, where $R_3$ is alkyl of 1 to 20 carbon atoms.

4. A compound according to claim 1, having the formula $(RS)_2-P-S-(CH_2)_n COO-alk$
$-OOC(CH_2)_n-S-P-(SR)_2$ where alk is an alkylene group of 2 to 10 carbon atoms.

5. A compound according to claim 4, wherein R is $(CH_2)_n COOR_3$.

6. A compound according to claim 5, wherein $R_3$ is alkyl of 1 to 18 carbon atoms.

7. A compound according to claim 1 which has formula (1), $o$ is 3 to 4, $m$ is 1 and $R_1$ is zero.

8. A compound according to claim 7, wherein $o$ is 4 and $R_2$ is zero.

9. A compound according to claim 8, wherein R is $(CH_2)_n COOR_3$.

10. A compound according to claim 8 wherein $R_3$ is alkyl of 1 to 18 carbon atoms.

11. A compound according to claim 7, wherein $o$ is 3 and $R_2$ is alkyl of 1 to 3 carbon atoms.

12. A compound according to claim 11, wherein R is $-(CH_2)_n COOR_3$.

13. A compound according to claim 12, wherein $R_2$ is alkyl of 1 to 2 carbon atoms and $R_3$ is alkyl of 1 to 2 carbon atoms.

References Cited

FOREIGN PATENTS 1,154,085  9/1963  Germany _____ 260—928

ANTON H. SUTTO, Primary Examiner

U.S. Cl. X.R.

99—150 R; 252—46.6, 400 A; 260—45.7 PS, 468 J, 526 S, 609 R, 814, 976